United States Patent [19]

Farr

[11] 4,358,721
[45] Nov. 9, 1982

[54] BRIDGE POSITIONING DEVICE

[75] Inventor: Aaron V. Farr, Logan, Utah

[73] Assignee: Abex Corporation, New York, N.Y.

[21] Appl. No.: 151,559

[22] Filed: May 20, 1980

[51] Int. Cl.³ .............................................. G05B 1/06
[52] U.S. Cl. ..................................... 318/604; 318/673
[58] Field of Search ........................ 318/601, 673, 604

[56] References Cited

U.S. PATENT DOCUMENTS

| | | | |
|---|---|---|---|
| 3,045,157 | 7/1962 | Jacquet et al. | 318/601 |
| 3,084,315 | 4/1963 | Coady-Farley et al. | 318/601 |
| 3,182,240 | 5/1965 | Schmid | 318/601 |
| 3,582,751 | 6/1971 | Rosshirt et al. | 318/601 X |
| 3,909,691 | 9/1975 | Wilson | 318/673 X |
| 4,263,539 | 4/1981 | Barton | 318/663 X |

*Primary Examiner*—B. Dobeck
*Attorney, Agent, or Firm*—Thomas S. Baker, Jr.; David A. Greenlee

[57] ABSTRACT

A control for the motor of a mechanism which adjusts the position of the distal end of a passenger loading bridge, which control, when actuated, causes the motor to operate and the adjustment mechanism to move the end of the bridge to a preset position.

3 Claims, 5 Drawing Figures

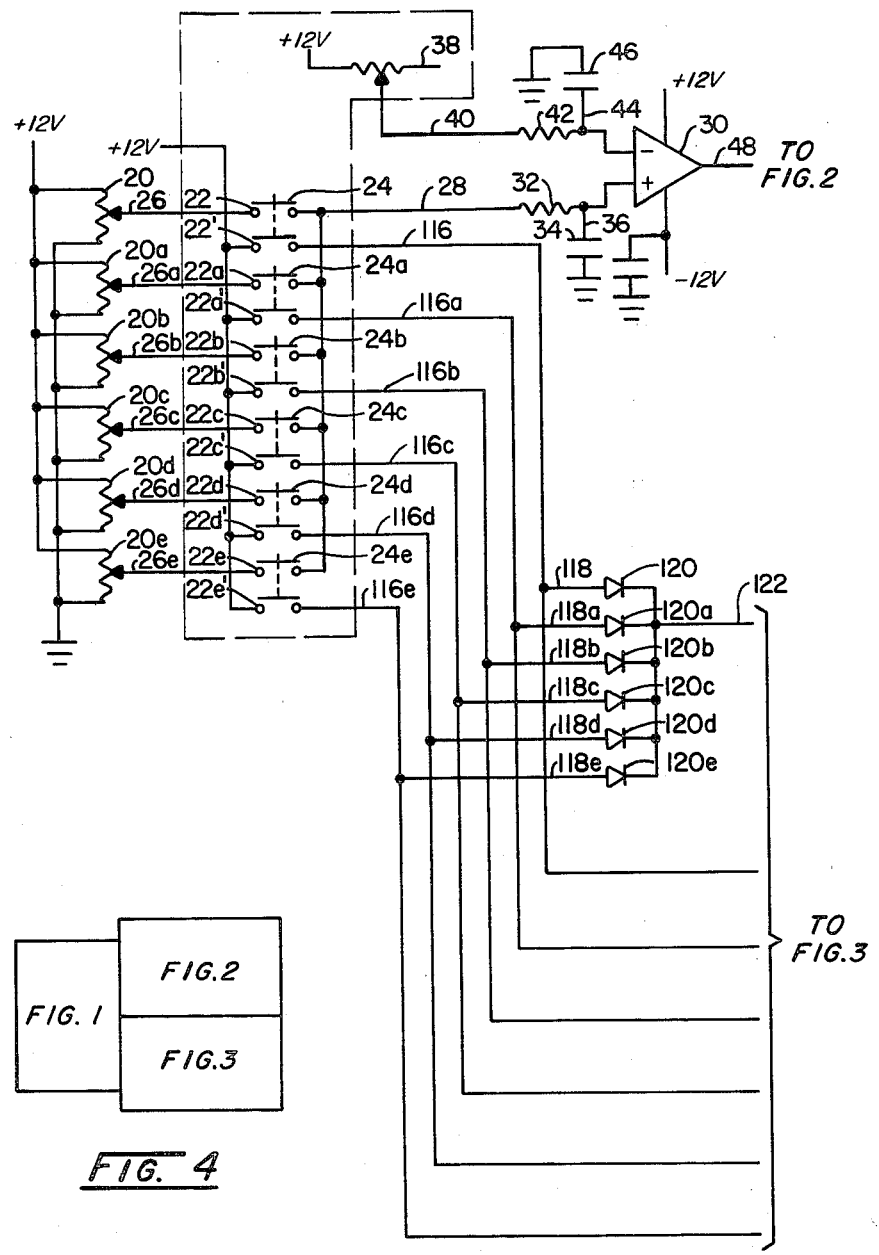

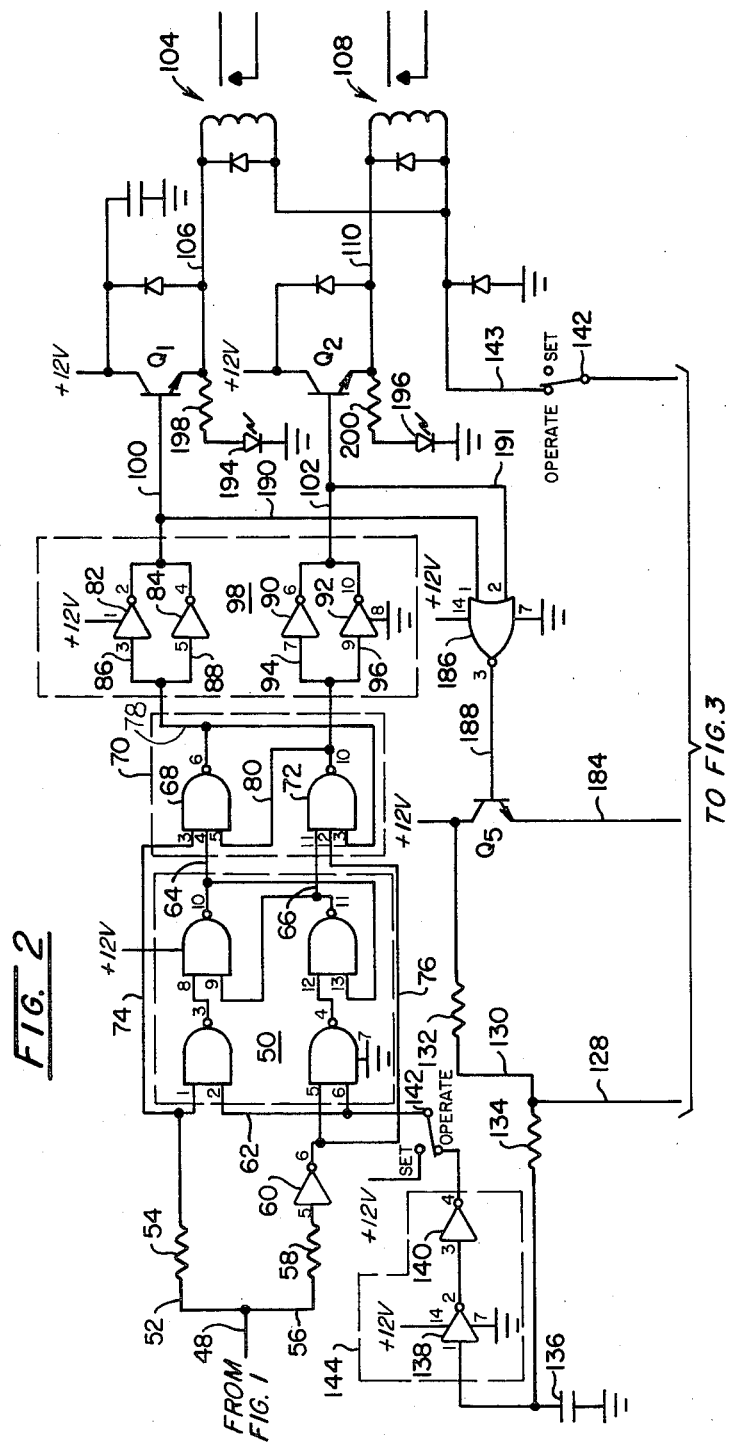

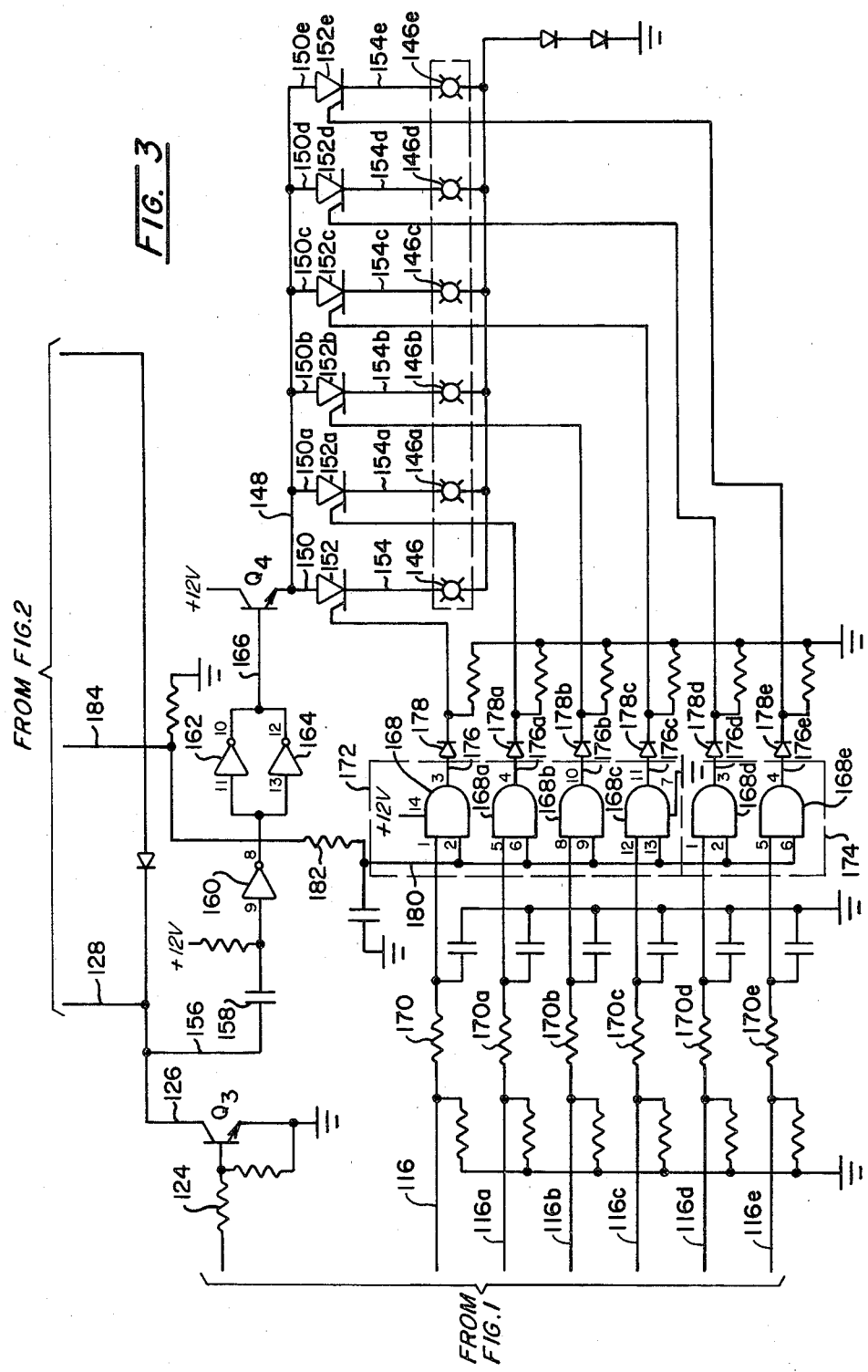

BRIDGE POSITIONING DEVICE

BACKGROUND OF THE INVENTION

1. Field of the Invention

This invention relates to a control for a mechanism which adjusts the position of a passenger loading bridge relative to a door on an aircraft.

2. Description of the Prior Art

A passenger loading bridge provides an enclosed passage for passengers to walk between a terminal building an an aircraft, as shown in U.S. Pat. Nos. 3,038,185; 3,184,772 and 3,358,308. Aircraft passenger loading bridges come in a wide variety of types and sizes. Some bridges have a fixed length and are pivotable radially about a fixed pivot between a stowed position and an aircraft engaging position, some bridges can be telescoped longitudinally and are pivotable radially about a fixed pivot and some bridges have a fixed length and are mounted on a stationary pedestal. An aircraft engaging cab is mounted on the distal end of each of the aforementioned types of bridges.

Each type of bridge has a mechanism for adjusting the vertical height of the cab at the distal end of the bridge. The height adjustment mechanism enables an operator to change the height of the distal end of the bridge so that the cab engages the doors of different types of aircraft at the proper location.

The height adjustment mechanism may be electromechanical, as where a motor drives a ball screw which raises or lowers the distal end of a bridge, or it may be electrohydraulic, as where a motor drives a pump which supplies fluid to extend or retract a hydraulic cylinder which raises or lowers the distal end of the bridge.

An operator operates the height adjustment mechanism by a control in the cab which operates the motor in the mechanism. Some bridges have a motor control which incorporates a joy stick. The joy stick enables an operator to control the motor to raise or lower the cab by moving the joy stick forward or backward. Movement in one direction runs the motor in one direction and causes the height adjustment mechanism to elevate the bridge, and movement in the other direction reverses the motor and causes the mechanism to lower the bridge.

Before a cab engages an aircraft, the operator adjusts the height of the cab at the distal end of the bridge by moving the joy stick until the mechanism has properly aligned the cab with the aircraft door. With some systems, the operator must visually determine the proper position of the cab with respect to an aircraft door and move the joy stick until the mechanism has moved the cab to the proper position.

Some passenger loading bridges are equipped with controls which automatically cause the height adjustment mechanism to move the cab to a predetermined height. One type of automatic control for a vertical height adjustment mechanism includes an electric control which has a console equipped with a number of push button type switches, each of which is labelled with the name of a different type of aircraft. Actuating a switch causes the mechanism to move the bridge column to a preset location so that the cab is properly aligned with the the door of the type of aircraft named on the switch label. Each switch in the console is connected to a mechanically actuated switch located adjacent the bridge column. When a switch is actuated, the bridge is moved until a cam mounted on the bridge column trips the mechanical switch, which interrupts power to the motor. The cam is positioned to trip the switch when the bridge reaches the preset position.

A problem with a control which incorporates a mechanically operated switch mounted on the bridge drive column is that it is difficult to adjust the cam which operates the switch. The cam is positioned on the bridge column which is beneath the bridge and is relatively inaccessible. Any adjustment must be done from underneath the bridge.

It is desirable to provide a control in which an operator can move the distal end of a passenger loading bridge to a preset position to accommodate a particular aircraft by actuating a switch.

It is also desirable to provide a control which enables the preset position to which the bridge is moved by the height adjustment mechanism when a switch is actuated to be easily changed by a mechanism accessible from inside of the bridge.

It is further desirable to cause the height adjustment mechanism to move the bridge only if the operator continuously engages a switch in the control and to stop the bridge from moving if the operator releases the switch before the bridge is at the preset position. This is to prevent an operator from walking away from the control when the bridge is moving, since it is desirable to have the operator in a position to avert an accident in the event of a system malfunction whenever the bridge is moving.

SUMMARY OF THE INVENTION

The instant invention provides a control for a vertical height adjustment mechanism for a passenger loading bridge. The control has a plurality of manual switches. When a switch is actuated it operates a motor which causes the vertical height adjustment mechanism to move the distal end of the bridge to a preset position which aligns the bridge cab with the door of a particular aircraft. The control requires an operator to continue to engage the switch until the bridge reaches the preset position. When the bridge reaches the preset position, it stops moving and an indicator light on the control panel is lit.

In the instant control, the preset position to which the adjustment mechanism moves the bridge when a switch is actuated can be easily adjusted from inside of the bridge.

DESCRIPTION OF THE DRAWINGS

FIGS. 1-3 when placed together form the schematic diagram for the control of the vertical height adjustment mechanism of this invention; and FIG. 4 illustrates the proper orientation of FIGS. 1-3 to form the aforementioned schematic diagram.

DESCRIPTION OF THE PREFERRED EMBODIMENT

Figure 5:
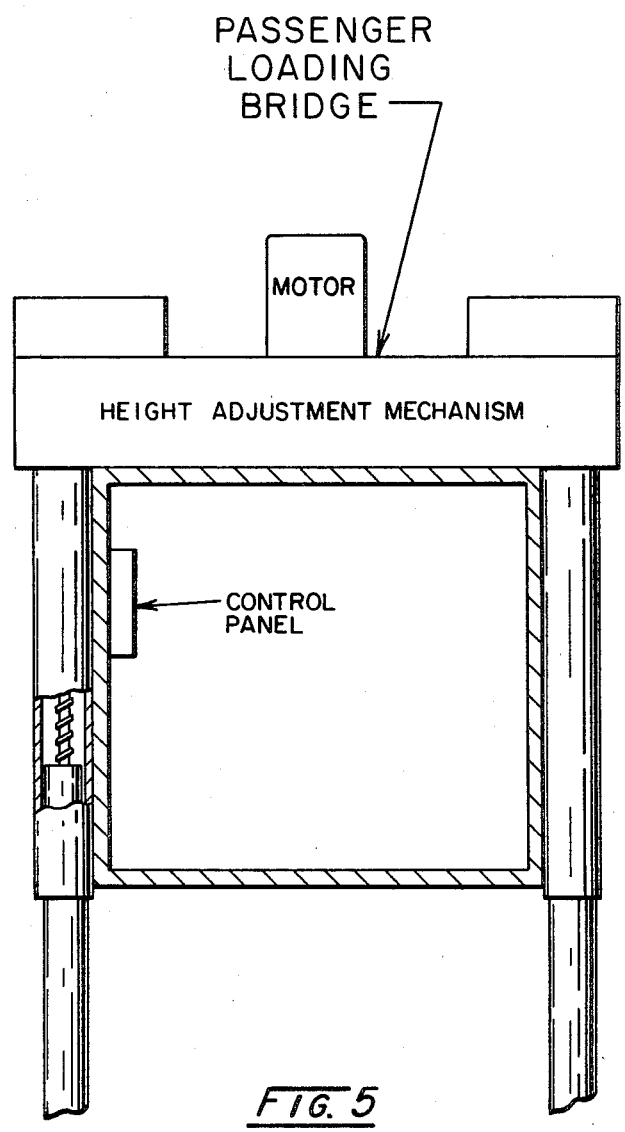
FIG. 5 is a block diagram which shows the relationship of the passenger loading bridge, the drive motor and the control panel.

The control of the instant invention is encased in a panel mounted on the inside of a passenger loading bridge, shown in FIG. 5. The control operates a motor in a vertical height adjustment mechanism, to cause the mechanism to move the distal, cab-supporting end of the bridge to a preset position. In the height adjustment mechanism a ballscrew drive by the motor is attached to the movable and fixed members of a vertical, telescoping drive column which supports the distal end of a passenger loading bridge. Operation of the motor in one direction causes the ballscrew to rotate in one direction which will raise the column and elevate the distal end of the passenger loading bridge. Operation of the motor in the other direction will cause the ballscrew to rotate in another direction to lower the column and the distal end of the passenger loading bridge.

Referring to FIG. 1 of the instant control, the outputs of six manually adjustable potentiometers 20, 20a, 20b, 20c, 20d, 20e are each connected to one terminal 22, 22a, 22b, 22c, 22d, 22e, respectively, of a single-throw, double-pole, push button type switch 24, 24a, 24b, 24c, 24d, 24e, respectively, by lines 26, 26a, 26b, 26c, 26d, 26e, respectively. Each of the switch terminals 22–22e is connected through the switch 24–24e to a line 28 which is coupled to a comparator 30 through a resistor 32. Line 28 is connected to ground through a capacitor 34 by a line 36. The purpose of capacitor 34 is to eliminate transient signals from entering comparator 30 through line 28.

A 12-volt source is connected to the input of each potentiometer 20–20e. The output of the potentiometer 20–20e to the terminal 22–22e of the switch 24–24e varies from zero to 12 volts depending upon the setting of the potentiometer. Each potentiometer 20–20e is set to provide a reference voltage which corresponds to a discrete vertical position of the drive column and bridge. Each switch 24–24e in the control panel is labelled with the name of an aircraft. When one of the switches 24–24e is actuated, the potentiometer 20–20e connected thereto will provide a reference voltage to comparator 30 through line 28 which corresponds to the proper preset vertical height for the drive column and bridge to accommodate that particular aircraft.

A potentiometer 38 is mounted on top of the telescoping drive column at the distal end of a passenger loading bridge. Part of potentiometer 38 is connected to the ballscrew. A 12-volt potential is impressed across potentiometer 38 so that as the column moves from the bottom position to the top position a line 40, which couples potentiometer 38 with comparator or amplifier 30 through a resistor 42, has a voltage which increases from zero to 12 volts. In other words, the voltage in line 40 is indicative of the vertical position of the drive column and bridge. A line 44 couples line 40 to ground through a capacitor 46 which functions to prevent transient signals from entering comparator 30 through line 40.

Comparator 30 looks at the analog inputs from lines 28 and 40 corresponding to the preset and actual bridge positions respectively and provides output data through line 48 which is the difference between the two inputs.

Referring to FIG. 2, line 48 is connected to pin 1 of the first stage of a latch 50 formed in an integrated circuit chip through a line 52 and a resistor 54. Line 48 is connected to pin 5 in the first stage of latch 50 through a line 56, a resistor 58 and an inverter 60. Consequently, the data at pin 5 is opposite that which is received at pin 1. If pin 1 sees a high, pin 5 sees a low, and if pin 1 sees a low, pin 5 sees a high. A 12-volt supply is connected to latch pin 14 and pin 7 is connected to ground. Pins 2 and 6 of latch 50 are tied together by line 62. When one of the switches 24–24e is actuated, data from line 48 is supplied to pins 1 and 5 of latch 50 and data in line 62 to pins 2 and 6 is high for a short time. Since data to pins 2 and 6 is high, the data to pins 1 and 5 determines the output of latch 50. After this, line 62 goes low to prevent the output of latch 50 from changing until the switch 24–24e is released and subsequently actuated. The signal in line 62 is explained hereinafter.

Latch 50 has two outputs and a feature of the latch 50 is that the data at the output pins 10 and 11 is always opposite. The output at pin 10 is connected with pin 4 of a three-in NAND gate 68 through line 64. Gate 68 is formed on an integrated circuit chip 70. The output at pin 11 of latch 50 is connected to pin 11 of a three-in NAND gate 72, also part of integrated circuit chip 70 through line 66.

A line 74 ties pin 1 of latch 50 to pin 3 of NAND gate 68 and a line 76 ties pin 5 of latch 50 to pin 12 of NAND gate 72. The output at pin 6 of NAND gate 68 is connected to input pin 13 of NAND gate 72 by a line 78, and the output at pin 10 of NAND gate 72 is connected to input pin 5 of NAND gate 68 by line 80.

The output at pin 6 of NAND gate 68 is connected to input pins 3 and 5 of a pair of parallel connected inverters 82, 84, respectively, through line 78 and through lines 86, 88, respectively. The output at pin 10 of NAND gate 72 is connected to input pins 7 and 9 of a second pair of parallel connected inverters 90, 92, respectively, through lines 94, 96, respectively. The inverters 82, 84, 90 and 92 are formed on a single integrated circuit chip 98. The 12-volt supply is connected to pin 1 of chip 98 and pin 8 is connected to ground. The output of inverter 82 at pin 2 and the output of inverter 84 at pin 4 are connected to a common line 100. The output of inverter 90 at pin 6 and the output of inverter 92 at pin 10 are connected to a common line 102. Inverters 82, 84 simply invert the output of NAND gate 68 and inverters 90, 92 similarly invert the output of NAND gate 72.

The function of the three-in NAND gates 68, 72 is to ensure that the inputs to the pairs of inverters 82, 84 and 90, 92 can both go high if the proper signal is received by the NAND gates 68, 72, but that the input to only one of the pairs of inverters 82, 84 and 90, 92 at a time can go low. This means that it is possible to have the outputs of both sets of inverters 82, 84 and 90, 92 low at the same time, but only one output can be high at any given time. A high output from one of the pairs of inverters 82, 84 and 90, 92 will operate the motor in one direction to raise the heigh adjustment mechanism and a high output from the other of the pairs of inverters 82, 84 and 90, 92 will operate the motor in the other direction to lower the height adjustment mechanism, as described hereinafter. Therefore, it is necessary to insure that only one pair of inverters 82, 84 and 90, 92 at a time have a high output.

Inverters 82, 84 are connected to the base of a transistor Q1 by line 100 and inverters 90, 92 are connected to the base of a transistor Q2 by line 102. The 12-volt supply is connected to the collectors of transistors Q1 and Q2. Transistor Q1 is connected to a relay 104 through a line 106 and transistor Q2 is connected to a relay 108 through a line 110. If the output of the inverter pair 82, 84 is high, current in line 100 turns on transistor Q1 and power is supplied to relay 104 to actuate the drive column motor to raise the drive column and bridge. If the output of the inverter pair 90, 92 is high, transistor Q2 is turned on and power is supplied to relay 108 to actuate the drive column motor to lower the drive column and bridge.

As previously mentioned, output data from comparator 30 is supplied to input pins 1 and 5 of latch 50 and this data determines the output of the latch 50. Further, in order for latch 50 to operate, the signal in line 62 which connects to latch input pins 2 and 6 must also be high. In the instant control, a high is supplied to input pins 2 and 6 from line 62 for a short period of time after one of the switches 24-24e is actuated. Subsequently, a low signal is supplied to line 62 and input pins 2 and 6 to prevent the output of latch 50 from changing until a switch 24-24e is released and subsequently actuated. The signal in line 62 will now be explained.

Referring to FIGS. 1-3, when a switch 24-24e is actuated, the 12-volt supply to the second switch terminal 22'-22e' is connected to the base of a transistor Q3 through line 116, 116a, 116b, 116c, 116d, 116e, line 118, 118a, 118b, 118c, 118d, 118e, diode 120, 120a, 120b, 120c, 120d, 120e, line 122 and resistor 124. The 12-volt supply energizes transistor Q3. The collector of transistor Q3 is connected to a 12-volt power supply through line 126, line 128, line 130 and a resistor 132. Line 130 is connected to line 62, which is attached to input pins 2 and 6 of latch 50 through a pair of inverters 138, 140 and a single-throw, double-pole switch 142. The two inverters 138, 140 are part of a single integrated chip 144. The 12-volt power supply is connected to chip pin 14 and pin 7 is connected to ground.

When transistor Q3 is energized, the 12-volt supply which was connected to input pin 1 of inverter 138 through line 130 and resistors 132, 134 to produce a high output from inverter 140 to latch input pins 2 and 6, is connected to ground through resistor 132 and transistor Q3. This causes the voltage between resistor 132 and resistor 134 to drop to very nearly zero. Consequently, a capacitor 136 in line 130 slowly discharges. As the capacitor 136 discharges, the input to pin 1 of inverter 138 starts to drop. In this instance, the inverter 138 is being used as a Schmitt trigger. When the input to pin 1 falls to a certain level, the output at pin 2 snaps high. The second inverter 140 then sees a high on input pin 3 and produces a low on output pin 4 which provides the low to line 62 and to input pins 2 and 6 of latch 50. Thus, it can be seen that when one of the switches 24-24e is actuated, output data from comparator 30 is supplied to input pins 1 and 5 of latch 50 and a high is supplied to line 62 and input pins 2 and 6 of latch 50 until capacitor 136 is discharged and the outputs of the inverters 138, 140 change. When the outputs of the inverters 138, 140 change, the data at pins 1 and 5 of latch 50 is latched and the output at pins 10 and 11 of latch 50 cannot change until the switch 24-24e is released and another switch is actuated.

Although the output of latch 50 cannot change once a switch 24-24e is actuated, the output of the NAND gates 68, 72 can change. When the output signal from comparator 30 to line 48 indicates that the position designated by the potentiometer 20-20e connected to the actuated switch 24-24e is the same as the actual position of the bridge column, a low signal will be provided to both pin 3 of NAND gate 68 and pin 12 of NAND gate 72. Consequently, outputs of the NAND gates 68, 72 will go high. This will make the inputs to both pairs of inverters 82, 84 and 90, 92 high and the outputs from these inverters to lines 100, 102, respectively, will go low to disable the relays 104, 108 and stop the motor.

The instant control has six position indicator lamps 146, 146a, 146b, 146c, 146d, 146e. The lamps 146-146e are mounted in the control panel adjacent each of the switches 24-24e, respectively. A lamp 146-146e lights when the drive column and bridge reach the preset height associated with the actuated switch 24-24e. Power is supplied to the lamps 146-146e from the 12-volt power supply through a transistor Q4, a line 148 connected to the emitter of transistor Q4, lines 150, 150a, 150b, 150c, 150d, 150e, respectively, silicon controlled relays 152, 152a, 152b, 152c, 152d, 152e, respectively, and lines 154, 154a, 154b, 154c, 154d, 154e, respectively. If a position indicating lamp 146-146e is lit, it is extinguished when a switch 24-24e is actuated to change the position of the bridge and a lamp 146-146e will not light until the bridge reaches the new preset position and the switch 24-24e remains actuated.

As mentioned above, when a switch 24-24e is actuated, transistor Q3 is turned on and voltage between resistors 132 and 134 in line 130 drops to a very low level. This same low voltage is seen in lines 128 and 126, since essentially a short circuit occurs across the collector and emitter of transistor Q3 when it is energized. The same low voltage is also seen in line 156 which is connected to line 126. A capacitor 158 in line 156 is connected to the 12-volt power supply. The 12-volt supply is connected to the base of transistor Q4 through an inverter 160, which is connected in series with a pair of parallel connected inverters 162, 164. Inverters 160, 162, 164 are part of the same integrated circuit chip 144 as inverters 138, 140, mentioned above. When the voltage in line 156 drops to a low level, the capacitor 158 begins to discharge. Consequently, the input to pin 9 of inverter 160 starts to go low. Inverter 160 operates like a Schmitt trigger and when the input reaches a sufficiently low point, the output at pin 8 snaps high. This makes the input to parallel connected inverters 162, 164 at pins 11 and 13 high and the output at pins 10 and 12 low. The low output means there is no power supplied to the base of transistor Q4 through line 166 and the transistor Q4 is turned off. This interrupts the 12-volt power supply to line 148, lines 150-150e, SCRs 152-152e, lines 154-154e and lamps 146-146e. Thus, any lighted lamp 146-146e is extinguished.

Capacitor 158 discharges only once when transistor Q3 is initially turned on. After that, a high is restored to input pin 9 of inverter 160 which causes a low to pins 11 and 13 of inverters 162, 164, respectively, and a high to the base of transistor Q4 which turns that transistor on. This restores the 12-volt supply to the SCRs 152-152e, as previously mentioned. However, before the power in line 150-150e can pass through an SCR 152-152e to light a lamp 146-146e, the SCR must be turned on. Once turned on, it will stay on until power in line 150-150e is interrupted.

An SCR 152-152e is turned on and a lamp 146-146e lights when two conditions are met. A switch 24-24e must be actuated and the drive column and bridge must be in the position which corresponds to the preset position for that switch 24-24e. These two conditions are sensed as follows. When a switch 24-24e is actuated, the 12-volt supply voltage is connected to one input of a two-in AND gate 168, 168a, 168b, 168c, 168d, 168e through switch terminals 22'-22e', a line 116-116e and a resistor 170, 170a, 170b, 170c, 170d, 170e. Four of the AND gates 168-168c are part of a single integrated circuit chip 172. A 12-volt supply is connected to pin 14 of the chip and pin 7 of the chip is connected to ground. Two of the AND gates 168d, 169e are part of another integrated circuit chip 174. Each AND gate 168-168e is connected to an SCR 152-152e through a line 176, 176a, 176b, 176c, 176d, 176e and a diode 178, 178a, 178b, 178c, 178d, 178e. However, power to one input of AND gate 168-168e from line 116-116e will not cause a high at the output of the AND gate 168-168e. Both inputs to the AND gate 168-168e must be high in order to have the output high. The second input to AND gate 168-168e is connected to line 180 and power is supplied to line 180 when the bridge reaches the preset position.

When the bridge reaches the preset position, the output of comparator 30 to line 48 drops low. This low is conveyed to NAND gate 68 through line 52, resistor 54 and line 74 and to NAND gate 72 through line 56, resistor 58, inverter 60 and line 76. The low to the inputs of the NAND gates 68, 72 causes their outputs to go high, which outputs are connected to the inputs of the pairs of inverters 82, 84 and 90, 92. This makes the outputs of these inverters in lines 100, 102 low which de-energizes the motor relays 104, 108, as previously mentioned. The two lines 100, 102 are connected to the input pins 1 and 2, respectively, of a two-in NOR gate 186, which is part of an integrated circuit chip 192, through lines 190, 191, respectively. The 12-volt supply is connected to pin 14 of chip 192 and pin 7 is connected to ground.

The NOR gate 186 is connected to the base of a transistor Q5 through line 188. The 12-volt power supply is connected to the collector of transistor Q5. AND gates 168-168e are connected to the emitter of transistor Q5 through line 180, resistor 182 and line 184. When both inputs to NOR gate 186 are low, as when the output of inverter pairs 82, 84 and 90, 92 are low, the output at pin 3 of NOR gate 186 is high. This provides power to the base of transistor Q5 to turn the transistor on. When transistor Q5 is on, power is supplied to the second input of AND gate 168-168e through line 184, resistor 182 and line 180. When power is supplied to line 180 and to a line 116-116e to make both inputs of the AND gate 168-168e high, the output of the AND gate 168-168e is high and power is received in the SCR 152-152e through line 176-176e to turn the SCR 152-152e on. When the SCR 152-152e is turned on, power in line 150-150e is supplied to a lamp 146-146e through line 154-154e and SCR 152-152e and the lamp lights.

If the switch 24-24e is released, one input to AND gate 168-168e drops low and power is interrupted to line 176-176e which is connected to the SCR 152-152e. However, the SCR 152-152e is not turned off. The SCR 152-152e is only turned off when power in line 150-150e is interrupted. Consequently, the lamp 146-146e will remain lit as long as the bridge remains in a preset position set by potentiometer 20-20e, even though switch 24-24e is released.

Operation of the control of the instant invention to move the drive column and bridge to a preset location will now be described. A push button type switch 24-24e which is labelled with the type of aircraft to be serviced is actuated. In the instant invention, the switch is actuated by simply pushing a button. The potentiometer 20-20e associated with that button 24-24e is preset to provide an output signal to line 26-26e, which indicates the desired preset position. This output is supplied to comparator 30. A second signal corresponding to the actual position of the bridge drive column is also supplied to comparator 30 from the potentiometer 38 mounted on the drive column. An output from comparator 30 equal to the difference between the two inputs is supplied to two inputs of latch 50. These inputs determine the two outputs of latch 50.

One of the latch 50 outputs is connected to an input of NAND gate 68 and the other output is connected to an input of NAND gate 72. The output of NAND gate 68 is connected to the input of the parallel pair of inverters 82, 84 and the output of NAND gate 72 is connected to the input of the parallel pair of inverters 90, 92. When the bridge is not in a preset position, the output of one of the two NAND gates 68, 72 is low and consequently the output of its associated parallel pair of inverters 82, 84 and 90, 92, respectively, is high. The high output from one of the inverter pairs 82, 84 and 90, 92 turns on one of the transistors Q1 or Q2, respectively, which, in turn, provides power to one of the motor relays 104, 108 to thereby start the motor and move the drive column and bridge to the preset position.

When a switch 24-24e is actuated, transistor Q3 is turned on and capacitor 158 discharges. The momentary discharge of capacitor 158 causes the input to inverter 160 to go low which causes the output of the parallel pair of inverters 162, 164 to go low and thereby interrupt the power to transistor Q4. Interruption of power to transistor Q4 turns off any SCR 152-152e which may be on and causes any lamp 146-146e which may be on to be extinguished. When the bridge reaches the preset position, the lamp 146-146e corresponding with that position is lit if the switch 24-24e is actuated when the bridge reaches that position. When the bridge reaches the preset position, transistor Q5 is turned on and power is supplied to one input of AND gate 168-168e. If switch 24-24e remains actuated, power is supplied to the other input of the AND gate 168-168e. When both inputs to the AND gate 168-168e are high, the output of the AND gate is high and the SCR 152-152e which is connected thereto is energized. This permits power from transistor Q4 to flow through the SCR 152-152e and light the lamp 146-146e which indicates the bridge has reached the predetermined position.

The control of the instant invention incorporates a simple way to adjust the preset position to which the height adjustment mechanism will move the drive column and bridge when a switch 24-24e is actuated. As previously mentioned, each switch 24-24e is connected to a manually adjustable potentiometer 20-20e. With a 12-volt supply connected to the potentiometer 20-20e, the output voltage from the potentiometer to the associated switch 24-24e is proportional to or indicative of a preset bridge position. Therefore, it is necessary to change the setting of a potentiometer 20-20e to change the preset position of the drive column. This adjustment is as follows.

To begin with, switch 142 which has two pairs of contacts as shown in FIG. 2, is moved from the "operate" to the "set" position. This causes two things to happen. Line 143 is opened and the relays 104, 108 are no longer energized. Thus, even if the power is supplied to the relays 104, 108, the motor cannot operate. Further, the 12-volt supply is connected to line 62 which causes the inputs to latch pins 2 and 6 to be high so that the output of latch 50 changes in direct response to the inputs to latch pins 1 and 5 from the output of comparator 30.

A separate manual control, not shown on the instant schematic, is actuated to operate the bridge motor to move the bridge to the preset height. Once the height adjustment mechanism has moved the bridge to the preset position, the potentiometer 20-20e, which is to provide an output indicative of the particular preset position, is adjusted so that the input to comparator 30 from the potentiometer 20-20e is identical to the input from the potentiometer 38 which provides an output proportional to the actual bridge position. As previously mentioned, when the bridge is at the desired preset position, the same data signal is supplied to each of the transistors Q1 and Q2 to turn off the relays 104, 108.

Referring to FIG. 2, a Dialco LED light 194, 196 is connected to the emitter of each transistor Q1, Q2, respectively, through a resistor 198, 200, respectively. If the same data is supplied to the base of each transistor Q1, Q2 when the bridge is in the preset position, the same current should flow from the base to the emitter of each of the two transistors. Therefore, when adjusting a potentiometer 20-20e, an operator simply adjusts that potentiometer until the brilliance of the two LED lights 194, 196 is equal. When this happens, it means that the potentiometer 20-20e being adjusted has the same value as the potentiometer 38, which indicates the actual position of the bridge. Each potentiometer 20-20e is adjusted this way so that the drive system motor will move the bridge to a particular preset position when a switch 24-24e is actuated.

In a test model of a control circuit structured in accordance with the present invention, the following significant component values and standard integrated circuit designations were used for the identified components. All resistors are ¼ watt, carbon having a ±5% tolerance except as noted. Clockwise rotation of potentiometers increases voltage.

| Transistors, Diodes, Integrated Circuits and LEDs | | |
|---|---|---|
| Number | Designation | |
| 60; 138; 140; 160; 162; 164 | 40106 | Hex Schmitt Trigger |
| 50 | 4011 | Quad 2-input NAND |
| 68; 72 | 4023 | Triple 3-input NAND |
| 168–168c | 4081 | Quad 2-input AND |
| 168d; 168e | 4081 | Quad 2-input AND |
| 178–178e | 1N914 | Diode |
| Q1; Q2 | Motorola MJE 803 | Darlington Pair |
| 30 | 741 | Operational Amplifier |
| 194; 196 | Dialco 5219166 | LED |
| 152–152e | 2N2328 | Silicon Controlled Rectifier |
| Q3 | 2N4921 | Transistor |
| Q4; Q5 | 2N2222 | Transistor |
| 186 | 4001 | Quad 2-input NOR |
| 82; 84; 90; 92 | 4049 | Hex Inverter |
| 120–120e | 1N914 | Diode |
| Number | Component | Value |
| 20–20e; 38 | Potentiometer | 5K |
| 32; 42; 54; 58; 134; 170–170e; 182 | Resistors | 100K |
| 132; 198; 200 | Resistors | 470 Ohms |
| 34; 46 | Capacitors | 1 Microfarad |
| 158 | Capacitor | 1 Microfarad |

From the above it can be seen that the instant invention provides a simple control for a vertical height adjustment mechanism for a passenger loading bridge. An operator can cause the vertical height adjustment mechanism to move the bridge to a preset position by actuating a switch and continuing to engage the switch until the bridge has reached the preset position. If the operator releases the switch, the bridge stops moving. When the bridge reaches the preset position, a lamp in the control lights to inform the operator that the bridge is at the preset position and the switch can be released.

Although the aforementioned description covers a control which operates a motor in a vertical height adjustment mechanism, an identical control can be used to operate a motor in a mechanism which positions a passenger loading bridge horizontally. In this case, a comparator simply compares the difference between the input from a potentiometer which indicates the actual angular position of the bridge with respect to a given position and the input from a potentiometer which indicates the desired angular position of the bridge. Like the plurality of potentiometers which are adjusted to give a signal corresponding to the bridge height for a particular aircraft, the control for the horizontal position of the bridge has a plurality of potentiometers, each of which is adjusted to give a signal corresponding to the angular bridge position for a specific aircraft. A push button type switch labelled with the name of an aircraft is actuated to move the bridge to the proper horizontal position to accommodate that aircraft.

Although a preferred embodiment of the invention has been illustrated and described, it will be apparent to those skilled in the art that various modifications may be made, such as using the control to operate a motor in a horizontal bridge position mechanism as described above, without departing from the spirit and scope of the present invention.

What is claimed is:

1. A control for the motor of a mechanism which adjusts the position of the distal end of a passenger loading bridge comprising:
   means for producing a first analog signal which indicates a preset position of the distal end of the bridge;
   means for producing a second analog signal which indicates the actual position of the distal end of the bridge;
   analog means for comparing said first and second analog signals; and
   actuating means for connecting the first signal producing means with the comparator means;
   said comparing means producing a third signal which indicates the direction the motor must run so that the adjustment mechanism will move the end of the bridge from the actual position to the preset position; characterized by:
   means for receiving and latching the data from the third signal;
   one relay which operates the motor in one direction;
   another relay which operates the motor in another direction;
   said receiving and latching means providing a fourth signal which actuates said one or another relay to cause the motor to operate in said one or another direction whereby the adjustment mechanism moves the end of said bridge;
   said comparing means producing a fifth signal which indicates the bridge end is at the preset position;
   means for sensing said fifth signal and de-energizing said one or another relays to thereby stop operation of the motor;
   means for indicating when the bridge end is at the preset position; and
   means for interrupting power to said indicating means when said actuating means is actuated to move the end of the bridge from the preset position.

2. A control for the motor of a mechanism which adjusts the position of the distal end of a passenger loading bridge comprising:
- means for producing a first analog signal which indicates a preset position of the distal end of the bridge;
- means for producing a second analog signal which indicates the actual position of the distal end of the bridge;
- analog means for comparing said first and second signals; and
- manual actuating means for connecting the first signal producing means with the comparator means;
- said comparing means producing a third signal which indicates the direction the motor must run so that the adjustment mechanism will move the end of the bridge from the actual position to the preset position; characterized by:
- means for receiving and latching the data from the third signal;
- one relay which operates the motor in one direction;
- another relay which operates the motor in another direction;
- said receiving and latching means providing a fourth signal which actuates said one or another relay to cause the motor to operate in said one or another direction whereby the adjustment mechanism moves the end of said bridge;
- said comparing means producing a fifth signal which indicates the bridge end is at the preset position;
- means for sensing said fifth signal and de-energizing said one or another relays to thereby stop operation of the motor;
- means for indicating when the bridge end is at the preset position;
- means for interrupting power to said indicating means when said actuating means is actuated to move the end of the bridge from the preset position; and
- means for simultaneously sensing when said one and said another relays are de-energized and said manual actuating means is actuated, and the second said sensing means produces a sixth signal which energizes said indicating means when said one and said another relays are de-energized and said manual actuating means is actuated.

3. A control for the motor of a mechanism which adjusts the position of the distal end of a passenger loading bridge comprising:
- means for producing a first analog signal which indicates a preset position of the distal end of the bridge;
- means for producing a second analog signal which indicates the actual position of the distal end of the bridge;
- analog means for comparing said first and second analog signals; and
- actuating means for connecting the first signal producing means with the comparator means;
- said comparing means producing a third signal which indicates the direction the motor must run so that the adjustment mechanism will move the end of the bridge from the actual position to the preset position; characterized by:
- means for receiving and latching the data from the third signal;
- one relay which operates the motor in one direction;
- another relay which operates the motor in another direction;
- said receiving and latching means providing a fourth signal which actuates said one or another relay to cause the motor to operate in said one or another direction whereby the adjustment mechanism moves the end of said bridge;
- said comparing means producing a fifth signal which indicates the bridge end is at the preset position;
- means for sensing said fifth signal and de-energizing said one or another relays to thereby stop operation of the motor;
- means for adjusting the first signal producing means, the adjusting means including a second indicating means with a variable output which indicates when the first relay is energized;
- a third indicating means with a variable output which indicates when the second relay is energized; and
- the outputs of said second and third indicating means are of the same magnitude when the first signal is the same as the second signal.

* * * * *